US012747511B2

(12) United States Patent
Dougherty et al.

(10) Patent No.: US 12,747,511 B2
(45) Date of Patent: Sep. 29, 2026

(54) SYSTEMS AND METHODS FOR DIRECT OXIDE PRODUCTION

(71) Applicant: Aqua Metals Inc., Reno, NV (US)

(72) Inventors: Brian James Dougherty, Emeryville, CA (US); Samaresh Mohanta, Dublin, CA (US); Benjamin Sol Taecker, Reno, NV (US); David Regan, McCarran, NV (US)

(73) Assignee: AQUA METALS INC., Reno, NV (US)

( * ) Notice: Subject to any disclaimer, the term of this patent is extended or adjusted under 35 U.S.C. 154(b) by 560 days.

(21) Appl. No.: 18/272,766

(22) PCT Filed: Jan. 21, 2022

(86) PCT No.: PCT/US2022/013296

§ 371 (c)(1),
(2) Date: Jul. 17, 2023

(87) PCT Pub. No.: WO2022/159689

PCT Pub. Date: Jul. 28, 2022

(65) Prior Publication Data

US 2025/0075357 A1 Mar. 6, 2025

Related U.S. Application Data

(60) Provisional application No. 63/140,562, filed on Jan. 22, 2021.

(51) Int. Cl.

| | |
|---|---|
| ***C25C 1/18*** | (2006.01) |
| ***B22F 1/05*** | (2022.01) |
| ***B22F 9/04*** | (2006.01) |
| ***B22F 9/24*** | (2006.01) |
| ***C01G 21/04*** | (2006.01) |
| ***C25C 7/00*** | (2006.01) |
| ***C25C 7/08*** | (2006.01) |
| ***H01M 4/57*** | (2006.01) |

(52) U.S. Cl.

CPC .................. *C25C 1/18* (2013.01); *B22F 9/04* (2013.01); *B22F 9/24* (2013.01); *C01G 21/04* (2013.01); *C25C 7/007* (2013.01); *C25C 7/08* (2013.01); *H01M 4/57* (2013.01); *B22F 1/05* (2022.01); *B22F 2009/043* (2013.01)

(58) Field of Classification Search

None

See application file for complete search history.

(56) References Cited

U.S. PATENT DOCUMENTS

| | | | | |
|---|---|---|---|---|
| 3,244,563 | A | 4/1966 | Coppersmith et al. | |
| 3,322,496 | A | 5/1967 | Vahrenkamp et al. | |
| 6,664,003 | B2 | 12/2003 | Prengaman et al. | |
| 9,837,689 | B2 | 12/2017 | Clarke et al. | |
| 10,340,561 | B2 | 7/2019 | Dougherty et al. | |
| 2006/0039852 | A1 | 2/2006 | Trischan et al. | |
| 2017/0170531 | A1* | 6/2017 | Spence | C25C 1/18 |
| 2018/0127888 | A1* | 5/2018 | Clarke | C25C 5/02 |
| 2019/0217390 | A1 | 7/2019 | Murphy et al. | |
| 2019/0267681 | A1 | 8/2019 | Dougherty et al. | |

FOREIGN PATENT DOCUMENTS

| | | | |
|---|---|---|---|
| GB | 1072923 | A | 6/1967 |
| GB | 2094286 | A | 9/1982 |
| KR | 1020170083634 | A | 7/2017 |
| WO | 02071511 | A2 | 9/2002 |
| WO | 2017189675 | A1 | 11/2017 |
| WO | 2019171282 | A1 | 9/2019 |

OTHER PUBLICATIONS

Mayer et al, Leady oxide for lead/acid battery positive plates: scope for improvement?, Journal of Power Sources, vol. 59, No. 1-2, Mar. 1996, pp. 17-24 (Year: 1996).*

Korean Office Action for Application No. KR 10-2023-7026590 dated Mar. 12, 2025; 8 pgs.

Extended European Search Report for European Patent Application No. 22743238.2 dated Jun. 17, 2025; 10 pgs.

Li et al., "Review on clean recovery of discarded/spent lead-acid battery and trends of recycled products," Journal of Power Sources, Jul. 9, 2019; vol. 436; 15 pgs.

Dix et al., "A comparison of barton-pot and ball-mill processes for making leady oxide," Journal of Power Sources, Feb.-Mar. 1987; 19(2-3):157-161.

Shin et al., "Preparation of leady oxide for lead-acid battery by cementation reaction," Journal of Power Sources, 2000; 89(1):46-51.

* cited by examiner

*Primary Examiner* — Harry D Wilkins, III

(74) *Attorney, Agent, or Firm* — Umberg Zipser LLP

(57) ABSTRACT

Lead oxide particles are produced in a ball mill or Barton pot-type process from a lead product formed by an electrolytic process that continuously generates metallic lead. The lead product may be in form of lead flakes, spongy lead, or a nano- and/or microcrystalline lead matrix that is directly obtained from the electrolytic process, optionally washed, and may be compressed before being fed to the ball mill or Barton pot-type process. Notably, thusly produced lead oxide particles have desirable purity and size distribution, despite the presence of residual aqueous solution from the electrolytic process that produced the feedstock for the ball mill or Barton pot.

20 Claims, No Drawings

SYSTEMS AND METHODS FOR DIRECT OXIDE PRODUCTION

This application claims priority to our US Provisional Patent application with the Ser. No. 63/140,562, filed Jan. 22, 2021, which is incorporated by reference herein.

FIELD OF THE INVENTION

The field of the invention is production of lead oxides for use in lead acid batteries, and especially as it relates to systems and methods for production of lead oxides from high purity lead in a micro- or nano-porous mixed matrix.

BACKGROUND OF THE INVENTION

The background description includes information that may be useful in understanding the present invention. It is not an admission that any of the information provided herein is prior art or relevant to the presently claimed invention, or that any publication specifically or implicitly referenced is prior art.

All publications and patent applications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In a typical manufacturing process to produce lead acid batteries, lead oxide containing battery paste is applied to grid lead for the formation of active materials. Notably, despite the conceptually simple process of forming lead oxide, only two methods are currently employed for commercial scale production of lead oxide: Oxidation of metallic lead in solid form using a grinding mill (e.g., ball mill) in which newly formed lead oxide is broken off metallic lead feed material and removed by a forced air stream as is for example described in GB 1,072,923. As the oxidation of lead is exothermic, the temperature of the mill must be tightly controlled to obtain a defined product specification and to avoid melting of the lead charge. In addition, numerous further operational parameters such as feed stock particle size, charge ratio, amplitude/rotational speed, etc. will significantly affect product composition and as such must also be closely monitored/controlled. Most typically, so produced lead oxide usually comprises 60-65 wt. % of α-PbO, with the remainder being unreacted metallic lead.

Most ball mills producing lead oxide (also known as lead sub oxide or grey lead oxide, having the formula 2PbO·Pb) include a front end with a lead melting furnace that melts lead ingots obtained from a lead refining operation. The molten lead is then cast into smaller objects, typically having cylindrical, hemi-spherical, or spherical geometry, which are then fed to the ball mill. In other plants, larger lead ingots from a prior casting operation may also be cut to smaller size prior feeding into the ball mill. As will be readily appreciated, such preprocessing is energy and time consuming and often produces additional undesirable emissions.

Alternatively, metallic lead can be also oxidized in liquid form in a process known as the Barton pot method. Here, high-purity lead is first melted in a separate vessel and then pumped to a reaction pot. The molten lead is rapidly stirred with a paddle under a forced flow of air, and lead droplets formed by the agitation are partially oxidized to lead oxide (PbO), which is carried by the air stream to a collecting system. The so produced lead oxide is primarily a mixture of tetragonal (α-PbO) and orthorhombic (β-PbO) lead oxide, together with some unreacted metallic lead. By changing the processing parameters, the proportion of lead oxide can be adjusted to vary, typically between 65 and 80 wt %.

For example, U.S. Pat. Nos. 3,322,496 and 3,244,563 teach a Barton pot process where molten lead is agitated against baffles in the presence of a forced air stream to produce lead oxides that are then removed from the head space of the pot. While such process overcomes at least some of the issues associated with a ball mill process, various difficulties nevertheless remain. Among other things, the overall production rate of lead oxide is typically less than a ball mill process and requires significant quantities of energy. Moreover, thermal control is still critical to maintain a desired product specification. To circumvent at least some of the problems associated with a classic Barton pot process, a continuous production reactor can be employed in which a laminar flow or atomized spray of molten lead is oxidized in a heated reactor portion as is described in US 2019/0217390.

Regardless of the particular manner of oxidation, it should be appreciated that the feed material to the process will generally require a lead feed stock with high purity, at a purity of typically better than 99.9% purity. While the feedstock can be modified with various ingredients such as calcium (as described in US 2006/0039852) or magnesium and optionally silver (as described in U.S. Pat. No. 6,664,003 and WO 02/071511), lead feedstock purity outside of the functional additives has generally been considered critical to the formation of lead oxides at a desirable yield. In addition, temperature excursions in both processes are typically detrimental to product quality and composition, and feedstock impurities that can lead to changes in temperature will in most cases lead to an off-spec product. Consequently, most Barton pot-type processes will require high-purity lead ingots as feedstock, thus increasing cost and energy demand.

Thus, even though various systems and methods of lead oxide production are known in the art, all or almost all of them suffer from several drawbacks. Therefore, there remains a need for compositions and methods for improved lead oxide production, especially as it relates to a simplified and more cost-effective provision of feedstock for a lead oxide production facility and lead oxide production.

SUMMARY OF THE INVENTION

The inventive subject matter is directed to various systems and methods of producing lead oxide particles from a feedstock other than high-purity lead feedstock such as high-purity lead ingots. To that end, the inventors have unexpectedly discovered that lead oxide particles can be consistently and directly produced at a desirable purity and size distribution from electrochemically produced lead flakes, spongy lead, and/or a nano- and/or microcrystalline lead matrix without the need of melting and ingoting. Advantageously, processes contemplated herein will save significant energy expenditure and time as the output of a lead producing electrolyzer can be used directly (typically after compression to briquettes) as input to a ball mill or Barton pot-type oxidation process.

In one aspect of the inventive subject matter, the inventors contemplate a method of producing lead suboxide that includes a step of producing at a cathode of an electrolytic reactor metallic lead from an aqueous lead ion-containing electrolyte, wherein the metallic lead is formed in form of lead flakes, spongy lead, or a nano- and/or microcrystalline lead matrix and wherein the metallic lead contains some of the aqueous lead ion-containing electrolyte. Such method will further include a step of harvesting the metallic lead from the electrolytic reactor and removing a portion of the aqueous electrolyte from the metallic lead to form a lead feedstock, and another step of feeding the lead feedstock into an oxidation device and operating the oxidation device under conditions that form the lead suboxide in particulate form. In such method the lead suboxide comprises a plurality of lead oxide particles and a plurality of metallic lead particles that have a size and composition suitable for use in lead acid battery active materials. Contemplated methods further comprise a step of removing at least some of the lead suboxide from the oxidation device.

In some embodiments, the metallic lead is removed from one portion of the cathode while additional metallic lead is formed from the lead ion-containing electrolyte on another portion of the cathode, and/or the cathode moves relative to the lead ion-containing electrolyte. Most typically, the portion of the aqueous electrolyte is removed from the metallic lead by replacement of the aqueous electrolyte with water, and/or by compressing the metallic lead.

Moreover, it is contemplated that the oxidation device is a ball mill or a Barton pot device. Therefore, it is contemplated that the lead suboxide will comprise between 20-40% metallic lead particles and between 60-80% lead oxide particles, and/or that the plurality of metallic lead particles and the lead oxide particles have an average particle size of about 0.1-10 micron.

Consequently, the inventors also contemplate a method of producing lead suboxide that includes a step of producing at a cathode of an electrolytic reactor metallic lead from an aqueous lead ion-containing electrolyte, wherein the metallic lead is formed in form of lead flakes, spongy lead, or a nano- and/or microcrystalline lead matrix and wherein the metallic lead contains some of the aqueous lead ion-containing electrolyte. In another step, a portion of the aqueous electrolyte is removed from the metallic lead to thereby form a lead feedstock for a ball mill, and in still another step, the lead feedstock is fed into the ball mill, and the ball mill is operated at a temperature and time that forms the lead suboxide, wherein the lead suboxide comprises a plurality of lead oxide particles and a plurality of metallic lead particles. Finally, at least some of the lead suboxide is removed from the ball mill.

In some embodiments the cathode moves relative to the electrolyte and/or the electrolyte is moved against the cathode. Most typically, the metallic lead is removed from the cathode during the movement of the cathode or movement of the electrolyte. Moreover, it is contemplated that the step of removing the portion of the aqueous electrolyte from the metallic lead comprises washing the metallic lead with water and/or compressing the metallic lead. In typical examples, the aqueous lead ion-containing electrolyte is an acidic electrolyte comprising an organic acid and/or an inorganic salt. Furthermore, it is preferred that the ball mill is operated to produce a composition that comprises between 20-40% metallic lead particles and between 60-80% lead oxide particles, and/or that the step of ball milling produces a composition with a plurality of lead and lead oxide particles having an average particle size of about 0.1-10 micron. Notably, the lead feedstock upon feeding into the ball mill may comprise residual electrolyte or water from a washing step.

The inventors still further contemplate a method of producing lead suboxide that includes a step of producing at a cathode of an electrolytic reactor metallic lead from an aqueous lead ion-containing electrolyte, wherein the metallic lead is formed in form of lead flakes, spongy lead, or a nano- and/or microcrystalline lead matrix and wherein the metallic lead contains some of the aqueous lead ion-containing electrolyte. In another step, at least some of the aqueous electrolyte is removed from the metallic lead to thereby form a lead feedstock for a ball mill, and the lead feedstock is melted to form a liquid lead feedstock (e.g., having a temperature of at least 650° F.). In still another step, at least a portion of the liquid lead feedstock is oxidized in a Barton pot process to form lead suboxide, wherein the lead suboxide comprises a plurality of lead oxide particles and a plurality of metallic lead particles. Finally, at least some of the lead oxide particles are removed from the Barton pot process.

In some embodiments, the cathode moves relative to the electrolyte and/or the electrolyte is moved against the cathode, and wherein the metallic lead is removed from the cathode during the movement of the cathode or movement of the electrolyte. Moreover, it is contemplated that the step of removing at least some of the aqueous electrolyte from the metallic lead comprises washing the metallic lead with water and/or compressing the metallic lead. Most typically, the aqueous lead ion-containing electrolyte is an acidic electrolyte comprising an organic acid or an inorganic salt.

Preferably, the ball mill is operated to produce a composition that comprises between 20-40% metallic lead particles and between 60-80% lead oxide particles, and/or the ball milling produces a composition with a plurality of lead and lead oxide particles having an average particle size of about 0.1-10 micron. Most typically, but not necessarily, the lead feedstock comprises the aqueous solution in an amount of between 0.5 and 5 wt %.

Various objects, features, aspects, and advantages of the inventive subject matter will become more apparent from the following detailed description of preferred embodiments.

DETAILED DESCRIPTION

The inventors have unexpectedly discovered that lead suboxide suitable for lead acid battery paste production can be prepared from the output material of an electrochemical lead ion reduction process without the need for melting and ingoting the output material. Such discovery was particularly unexpected as conventional wisdom in the art generally required the lead feedstock for a ball mill or Barton pot-type process to be of very high purity.

In contrast, the output material used by the inventors was lead flakes, spongy lead, or a nano- and/or microcrystalline lead matrix that was typically compressed into a briquette and that could even contain appreciable quantities of electrolyte and/or water. Indeed, even in the presence of sulfur-containing acids such as methane sulfonic acid in the electrolyte or water in the output material, the lead oxide produced by the ball mill or Barton pot-type process had consistent and desirable chemical composition and size.

In one typical embodiment, metallic lead is electrochemically produced in a continuous process in which a rotating cathode is partially immersed in a lead ion-containing acidic electrolyte where lead is being reduced on the immersed portion of the cathode and in which metallic lead is removed from the non-immersed portion of the cathode. Most typically, the electrolyte is an aqueous solution of methane sulfonic acid and the rotating cathode is typically made of aluminum.

In such process, the metallic lead is recovered from the cathode in form of a micro- and/or nanoporous mixed matrix in which the lead has micro- and/or nanometer sized structures (typically needles/wires/trees/dendrites) that trap some of the electroprocessing solvent and some molecular hydrogen (i.e., $H_2$), a portion of which is being expelled under compression of the matrix under its own weight. Most notably, such matrix had a black appearance and a remarkably low bulk density. Indeed, in some embodiments the matrix was observed to float on the solvent and had a density of less than 1 g/$cm^3$. Upon pressing the matrix or application of other force, the density increased (e.g., 1-3 g/$cm^3$, or 3-5 g/$cm^3$, or higher) and a metallic silvery sheen appeared. In other embodiments, the mixed matrix is removed from the cathode (e.g., by wiping or scraping) and has a density of 3-5 g/$cm^3$, 5-7 g/$cm^3$, 7-9 g/$cm^3$, or higher. Viewed from a different perspective, it should be appreciated that the mixed matrix included metallic lead at high purity (e.g., at least 99.9%, or at least 99.99%, or at least 99.999%, or at least 99.9999%) together with molecular hydrogen and residual electrolyte.

In most typical processes of forming the mixed matrix, the reduced lead ions will not form a tightly bonded film on the cathode but can be readily removed from the cathode by simply moving the cathode relative to the electrolyte, vibrating the cathode, or by wiping the cathode with a material to which the lead could adhere (e.g., plastic, lead-film, etc.). Therefore, lead recovery can be performed in a continuous manner. Particularly where a rotating or reciprocating electrode was employed, lead ions could be reduced on one part of an electrode or electrode assembly, while metallic lead can be removed from another part of the electrode or electrode assembly. In other examples, the lead may be removed from the cathode by vibrating the cathode or by jetting a fluid across the cathode. Exemplary contemplated systems, methods, and devices to produce a mixed matrix used in the processes according to the inventive subject matter are described in U.S. Pat. Nos. 9,837,689 and 10,340,561, both of which are incorporated by reference herein.

In still other embodiments, the metallic lead can also be produced in an electrochemical process from a typically aqueous electrolyte as is described in WO 2019/171282. Here the electrolyte is typically an aqueous solution of ammonium chloride and the electrodes are in most cases disposed in an electrochemical flow-through cell. To remove the metallic lead, typically in form of lead flakes, the cathodes may be subjected to sonication, jetting with electrolyte, and or motion of the cathode. Thusly dislodged metallic lead can then be used in the direct oxide process as feedstock to a ball mill or Barton pot oxidizer.

Upon generation of the lead flakes, spongy lead, or mixed matrix, it is typically preferred that the lead materials are subjected to a compression process to remove at least some of the trapped electrolyte and optionally hydrogen, and it is generally preferred that the materials are subjected to a briquetting process that produces lead briquettes with reduced electrolyte and/or water content. In alternative aspects, the compression can also be performed using a filter press, be gravity driven as a draining process, etc. As will be readily appreciated, the electrochemically produced metallic lead can be also subjected to a wash step prior to briquetting to remove at least some of the acid or other component and/or to wash-in one or more alloying metals such as magnesium, calcium, silver, etc. In most typical embodiments, the compressed lead materials are then directly used as a feedstock to a ball mill or Barton pot-type process.

As will be readily appreciated, the lead materials may be compressed to remove at least some of the electrolyte or other solvent that may be present. For example, where the lead materials are obtained from an aquarefining process, compression may remove at least 50%, or at least 60%, or at least 70%, or at least 80%, or at least 90%, or at least 95% of the electrolyte or other solvent. Where desired, it should also be noted that the lead materials may be washed with water or other solvent to remove residual electrolyte and/or other undesired components. Compression may be performed in numerous manners known in the art. For example, compression may be performed using filter pressing, roller pressing, and/or briquetting. Moreover, compression will also be employed to achieve a form factor that is suitable for ball milling, and all forms, sizes, and shapes currently used for ball milling are deemed suitable for use herein. For example, contemplated shapes include cylinders, spheres, hemi-spheres, pellets, regularly shaped and irregularly shaped forms. Moreover, it should be noted that the compressed lead can have any suitable weight for ball milling, such as for example, between 100 g and 1,000 g, or between 300 g and 3,000 g, or between 600 g and 6,000 g, or between 1,000 g and 10,000 g, or between 10,000 g and 50,000 g, or even higher.

Ball milling may then be performed using conventional equipment and processes that are well known in the art. Most typically, the ball mill process will produce a composition that comprises between 20-40% metallic lead and between 60-80% lead sub oxides and/or a composition with a plurality of lead and lead sub oxide particles having an average particle size of about 0.1-10 micron. Of course, it should be recognized that the ball mill process can be adjusted to provide different product specifications and compositions using (e.g., temperature, oxidizing gas flow, material residence time, etc.) adjustments known in the art. Moreover, it should be noted that the ball mill can be an existing ball mill for which the melting and recasting modules can be retired, or a de novo installation that is fed with the lead feedstock materials (e.g., produced by an aquarefining process). Consequently, it should be appreciated that the ball mill may be collocated with the lead material production, or be located in a remote location (e.g., at a distance of at least 1 mi, or at least 5 mi, or at least 10 mi, or at least 50 mi, or at least 100 mi).

Preferred Barton pot-type processes will use the compressed lead materials in a molten form, typically at a temperature of at least 650° F. Among other suitable options for Barton pot-type processes, especially contemplated processes include those where the liquid lead feedstock is sprayed into an oxygen-containing atmosphere as is, for example, described in US 2019/0217390, and those in which the liquid lead feedstock is agitated in the presence of an oxygen-containing air stream as is, for example, described in U.S. Pat. No. 3,322,496, both of which are incorporated by reference herein. As will be readily appreciated, the Barton pot-type processes contemplated herein will also be able to produce metallic lead particles, depending on the particular operating conditions set for the specific Barton pot-type process. Most typically, at least a portion of the lead oxide particles (and metallic lead particles where present and/or desired) will be removed from the process for further use, and most typically for use in lead acid battery paste production. In other words, the Barton pot process can produce lead suboxide that comprises lead oxide particles and metallic lead particles.

In this context, it should be recognized that contrary to conventional wisdom, use of a relatively heterogenous/ impure feedstock, and especially a lead feedstock that comprises metallic lead and an aqueous solution such as water or an aqueous electrolyte containing a sulfur-containing acid (e.g., alkane sulfonic acid, sulfuric acid, sulfamic acid, etc.) and/or inorganic salt still allowed for consistent production of lead oxide particles having a desirable size distribution and purity at a specified content of metallic lead particles. While not wishing to be limited by a specific theory or hypothesis, the inventors contemplate that residual sulfurous compounds, upon melting to form the liquid feedstock for a Barton pot process will be burnt off as $SO_2$, $SO_3$, $CO_2$, and that residual sulfurous compounds will react with lead to form $PbSO_4$ and PbS, which will be in turn oxidized by $O_2$ that is generated from the water in the feedstock. Molecular hydrogen in the feedstock will readily react to $H_2S$ and $H_2O$, both of which can further react with metallic lead to form lead oxide and PbS (which is then oxidized to lead oxide). Similar reactions are deemed likely where the lead feedstock undergoes exothermic processing in a ball mill. Thus, impurities that would otherwise lead to process instabilities and contamination are advantageously driven off without significantly affecting the product purity and lead oxide particle size distribution.

With respect to suitable lead feedstocks, it should be appreciated that the lead feedstock need not necessarily be prepared as noted above, but that all manners of electrochemical and redox-based chemical methods are deemed appropriate for use herein so long as such feedstock is not in form of a solid metallic lead deposit (as can be obtained in electrorefining) that is bonded to a cathode surface. Therefore, and viewed from a different perspective, the lead feedstock will include at least some solvent such as an aqueous solution, non-aqueous solution, and/or electrolyte. Viewed from another perspective, contemplated feedstock will include all metallic lead containing materials that are prepared in a lead production process other than smelting or ingoting. Therefore, the feedstock may include aqueous electrolytes, which may be acidic (e.g., containing acids such as carboxylic acids, sulfuric acid, sulfamic acid, an alkane sulfonic acid, fluoboric acid, etc.) or basic (e.g., containing sodium or potassium hydroxide, sodium carbonate, etc.) electrolytes, include organic and/or inorganic salts, non-aqueous or molten salt electrolytes, and/or water.

For example, the residual (aqueous) solution may be present in the lead feedstock in an amount of at least 0.1 wt %, or at least 0.2 wt %, or at least 0.3 wt %, or at least 0.4 wt %, or at least 0.5 wt %, or at least 1 wt %, or at least 1.5 wt %, or at least 2.5 wt %, or at least 3.5 wt %, or at least 5 wt %, or at least 7 wt %, or at least 10 wt %. Thus, the residual (aqueous) solution may be present in the lead feedstock in an amount of between 0.1-0.5 wt %, or between 0.5-1.0 wt %, or between 1.0-2.5 wt %, or between 2.5-5.0 wt %, or between 5.0-7.5 wt %, or between 5.0-10 wt %. Depending on the particular residual (aqueous) solution, the solution may also include a salt, an acid, and/or base component, typically in an amount of between 0.01 and 0.1 wt %, or between 0.05 and 0.5 wt %, or between 0.5 and 2.5 wt %, or between 2.5 and 5 wt %, or between 5 and 10 wt %, or between 10 and 20 wt %, or between 15 and 35 wt %, or 25 and 50 wt %, or even higher. Thus, the salt, acid, and/or base component will be present in the solution in an amount of least 5 wt % or at least 10 wt %, or at least 20 wt %, or at least 30 wt %.

The purity of the metallic lead in the lead feedstock will generally be at least 98%, at least 99%, more preferably at least 99.9%, or at least 99.99%, or at least 99.999%, or at least 99.9999%. However, it should be appreciated that the lead feedstock may also be doped with one or more metals to improve oxidation, and especially preferred metals include calcium, magnesium, and silver.

Depending on the particular nature and operational parameters of the Barton pot-type process or ball mill operating conditions, it should be appreciated that the process product may be exclusively lead oxide particles, or a mixture or lead oxide particles and metallic lead particles. Therefore, various ratios of lead oxide particles to metallic lead particles are contemplated, and suitable quantities of lead oxide particles in the process product will be at least 50%, or at least 60%, or at least 70%, or at least 75%, or at least 80%, or at least 85%, or at least 90%, or at least 95%, or at least 98%, or even higher. Thus, the ratio of lead oxide particles to metallic lead particles may be between 99:1 and 9:1, or between 95:5 and 8:2, or between 9:1 and 75:25, or between 8:2 and 7:3, or between 8:2 and 65:35, etc.

In still further contemplated aspects, the purity of the lead oxide and lead particles is generally well above 99%. For example, the purity of lead oxide and/or metallic lead particles will be at least 99%, or at least 99.9%, or at least 99.95%, or at least 99.99%, or at least 99.995%, or even higher. In one or more embodiments, the product of the ball mill or Barton pot-type process may comprise from 0 wt % to 100 wt % of orthorhombic lead oxide. For example, the product material may comprise orthorhombic lead oxide in an amount of from 0 wt % to 10 wt %, from 10 wt % to 20 wt %, from 20 wt % to 30 wt %, from 30 wt % to 40 wt %, from 40 wt % to 50 wt %, from 50 wt % to 60 wt %, from 60 wt % to 70 wt %, from 70 wt % to 80 wt %, from 80 wt % to 90 wt %, from 90 wt % to 100 wt %, or any combination thereof. In additional embodiments, the product of the ball mill or Barton pot-type process may comprise from 0 wt % to 100 wt % of tetragonal lead monoxide. For example, the product material may comprise tetragonal lead monoxide in an amount of from 0 wt % to 10 wt %, from 10 wt % to 20 wt %, from 20 wt % to 30 wt %, from 30 wt % to 40 wt %, from 40 wt % to 50 wt %, from 50 wt % to 60 wt %, from 60 wt % to 70 wt %, from 70 wt % to 80 wt %, from 80 wt % to 90 wt %, from 90 wt % to 100 wt %, or any combination thereof.

According to additional embodiments, the product material of the presently described ball mill or Barton pot-type process may comprise a mixture of tetragonal lead oxide, orthorhombic lead oxide and metallic lead (otherwise referred to as free lead), in all proportions from 0 wt % to 100 wt % for any single component. Typical requirements for lead acid battery active material specify a mixture of tetragonal lead oxide as a major component, metallic lead as a minor component and orthorhombic lead oxide permissible in small amounts. For example, the product may comprise of a mixture of tetragonal lead oxide, orthorhombic lead oxide and metallic lead in the wt % proportions of 90:0:10, 85:0:15, 80:0:20, 75:0:25, 70:0:30, 65:0:35, 90:5:5, 85:5:10, 80:5:15, 75:5:20, 70:5:25, 65:5:30, 60:5:35, 80:15:5, 75:15:10, 70:15:15, 65:15:20, 60:15:25, 55:15:30, 50:15:35, or in any other 3-component combination thereof. However, some lead acid battery technologies may require a mixture with a greater portion of orthorhombic lead oxide. For example, the product may comprise of a mixture of tetragonal lead oxide, orthorhombic lead oxide and metallic lead, where the orthorhombic portion may comprise in an amount from 15 wt. % to 20 wt. %, 20 wt. % to 25 wt. %, 25 wt. % to 30 wt. %, 30 wt. % to 35 wt. %, 35 wt. % to 40 wt. %, 40 wt. % to 45 wt. %, 45 wt. % to 50 wt. %, or any combination thereof.

Moreover, it is contemplated that the size distribution of the lead oxide (and metallic lead) particles produced by the ball mill or Barton pot process using the lead feedstock presented herein will be relatively uniform and will have a diameter of 1000 microns or less (e.g., 500 microns or less, 400 microns or less, 300 microns or less, 200 microns or less, 100 microns or less, 50 microns, 25 microns or less, and even smaller). For example, the lead oxide (and metallic lead) particles may fit through a No. 50 mesh US standard sieve and will therefore have a diameter of 300 microns or less. However, some particles may be much smaller than those having a diameter of 300 microns or less. For example, the $d_{50}$ (median) diameter of contemplated lead oxide (and metallic lead) particles may be from 1 to 5 microns, from 5 microns to 10 microns, from 10 microns to 25 microns, from 25 microns to 50 microns, from 50 microns to 100 microns, from 100 microns to 150 microns, from 150 microns to 200 microns, from 200 microns to 250 microns, from 250 microns to 300 microns, or any combination thereof. Viewed from a different perspective, it is therefore contemplated that lead oxide particles may be prepared where 95 wt % of the lead oxide particles has a diameter of 100 microns or less, or metallic lead particles may be prepared where 95 wt % of the lead particles have a diameter of 1000 microns or less.

EXAMPLES

A lead-containing aqueous electrolyte, with ~25 wt % total methanesulfonate as a mixture of free acid and metal ion salts, was pumped through an electrolyzer operated under conditions such that elemental lead was formed on the surface of a rotating cathode. The metallic lead was formed as a micro- and/or nanoporous mixed matrix and contained about 40 wt % retained electrolyte. The metallic lead was continuously removed from the moving cathode by a scraper, deposited on a conveyor, and transported to a briquetting machine (typically without a washing step) which squeezed about 85-90% of the entrained electrolyte out of the lead to produce a lead briquette comprising about 95 wt % solid lead, with 5 wt % electrolyte retained in the pores of the briquette. The briquettes were allowed to air dry for a period ranging from a few days to a few weeks (preferably within three days or less) allowing the surface moisture to dry, but considerable moisture remained internally within the pores and body of the briquette. The composition of the electrolyte entrained in the briquetted lead was ~25 wt % methanesulfonate, ~4 wt % dissolved lead, and ~1.3 wt % metal impurities. Sulfur, as a component of methanesulfonic acid, made up about 8 wt % of the electrolyte.

Barton Pot Process: The briquettes were melted into the melting pot attached to a Barton Pot lead oxide manufacturing process. The temperature of the melting pot was maintained at approximately 630-650° F. while the briquettes were melted. Dross formed on melting the briquettes was removed (to reduce impurity build-up) from the melting pot prior to feeding the molten lead into the reaction pot for conversion to oxide. The lead oxide formed was found to have purity at least 99.97%, with less than 0.002 wt % (cumulatively) of critical impurities such as Fe, Cu, Zn, Cd, As, Sn, Sb, Ni and Bi. The bulk of the impurities were non-critical elements such as Na, Al, K, Ca and Ba. Notably, S was not detected in the product lead oxide.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. The recitation of ranges of values herein is merely intended to serve as a shorthand method of referring individually to each separate value falling within the range. Unless otherwise indicated herein, each individual value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise. As also used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification or claims refer to at least one of something selected from the group consisting of A, B, C . . . and N, the text should be interpreted as requiring only one element from the group, not A plus N, or B plus N, etc.

What is claimed is:

1. A method of producing lead suboxide, comprising:

producing at a cathode of an electrolytic reactor metallic lead from an aqueous lead ion-containing electrolyte, wherein the metallic lead is formed in form of lead flakes, spongy lead, or a nano- and/or microcrystalline lead matrix and wherein the metallic lead contains some of the aqueous lead ion-containing electrolyte;

harvesting the metallic lead from the electrolytic reactor, removing at least a portion of the aqueous lead ion-containing electrolyte from the metallic lead to form a lead feedstock comprising the aqueous lead ion-containing electrolyte in an amount of at least 1 wt %, wherein the aqueous lead ion-containing electrolyte comprises an impurity, and optionally wherein the impurity comprises a sulfurous compound;

feeding the lead feedstock into an oxidation device and operating the oxidation device under conditions that form the lead suboxide in particulate form and oxidizes the impurity;

wherein the lead suboxide comprises a plurality of lead oxide particles and a plurality of metallic lead particles that have a size and composition suitable for use in lead acid battery active materials and wherein the lead suboxide comprises the impurity in an amount of less than 0.01 wt. %;

wherein the plurality of metallic lead particles and the lead oxide particles have an average particle size of 1-500 microns at a purity of at least 99%; and removing at least some of the lead suboxide from the oxidation device.

2. The method of claim 1, wherein the metallic lead is removed from one portion of the cathode while additional metallic lead is formed from the lead ion-containing electrolyte on another portion of the cathode, and/or wherein the cathode moves relative to the lead ion-containing electrolyte.

3. The method of claim 1, wherein the portion of the aqueous electrolyte is removed from the metallic lead by replacement of the aqueous electrolyte with water.

4. The method of claim 1, wherein the portion of the aqueous electrolyte is removed from the metallic lead by compressing the metallic lead.

5. The method of claim 1, wherein the oxidation device is a ball mill.

6. The method of claim 1, wherein the oxidation device is a Barton pot.

7. The method of claim 1, wherein the lead suboxide comprises between 20-40% metallic lead particles and between 60-80% lead oxide particles, and/or wherein sulfur is not detectable in the lead oxide.

8. A method of producing lead suboxide having a purity of at least 99%, comprising:

producing at a cathode of an electrolytic reactor metallic lead from an aqueous lead ion-containing electrolyte, wherein the metallic lead is formed in form of lead flakes, spongy lead, or a nano- and/or microcrystalline lead matrix and wherein the metallic lead contains some of the aqueous lead ion-containing electrolyte;

removing at least a portion of the aqueous lead ion-containing electrolyte from the metallic lead to thereby form a lead feedstock for a ball mill, wherein the lead feedstock comprises the aqueous lead ion-containing electrolyte in an amount of at least 1 wt %, wherein the aqueous lead ion-containing electrolyte comprises an impurity, and optionally wherein the impurity comprises a sulfurous compound;

feeding the lead feedstock into the ball mill, and operating the ball mill at a temperature and time that forms the lead suboxide and oxidizes the impurity, wherein the lead suboxide comprises a plurality of lead oxide particles and a plurality of metallic lead particles and wherein the lead suboxide comprises the impurity in an amount of less than 0.01 wt. %; and removing at least some of the lead suboxide from the ball mill.

9. The method of claim 8, wherein the cathode moves relative to the electrolyte and/or wherein the electrolyte is moved against the cathode, and wherein the metallic lead is removed from the cathode during the movement of the cathode or movement of the electrolyte.

10. The method of claim 8, wherein the step of removing the portion of the aqueous electrolyte from the metallic lead comprises washing the metallic lead with water and/or compressing the metallic lead.

11. The method of claim 8, wherein the aqueous lead ion-containing electrolyte is an acidic electrolyte comprising an organic acid and/or an inorganic salt.

12. The method of claim 8, wherein the ball mill is operated to produce a composition that comprises between 20-40% metallic lead particles and between 60-80% lead oxide particles, and/or wherein the step of ball milling produces a composition with a plurality of lead and lead oxide particles having an average particle size of about 0.1-10 micron.

13. The method of claim 8, wherein the lead feedstock upon feeding into the ball mill comprises residual electrolyte or water from a washing step.

14. A method of producing lead suboxide having a purity of at least 99%, comprising:

producing at a cathode of an electrolytic reactor metallic lead from an aqueous lead ion-containing electrolyte, wherein the metallic lead is formed in form of lead flakes, spongy lead, or a nano- and/or microcrystalline lead matrix and wherein the metallic lead contains some of the aqueous lead ion-containing electrolyte;

removing at least some of the aqueous lead ion-containing electrolyte from the metallic lead to thereby form a lead feedstock for a Barton pot process, wherein the lead feedstock comprises the aqueous lead ion-containing electrolyte in an amount of at least 1 wt %, wherein the aqueous lead ion-containing electrolyte comprises an impurity, and optionally wherein the impurity comprises a sulfurous compound;

melting the lead feedstock to form a liquid lead feedstock;

oxidizing at least a portion of the liquid lead feedstock in a Barton pot process to form lead suboxide and oxidize the impurity, wherein the lead suboxide comprises a plurality of lead oxide particles and a plurality of metallic lead particles and wherein the lead suboxide comprises the impurity in an amount of less than 0.01 wt. %; and removing at least some of the lead oxide particles from the Barton pot process.

15. The method of claim 14, wherein the cathode moves relative to the electrolyte and/or wherein the electrolyte is moved against the cathode, and wherein the metallic lead is removed from the cathode during the movement of the cathode or movement of the electrolyte.

16. The method of claim 14, wherein the step of removing at least some of the aqueous electrolyte from the metallic lead comprises washing the metallic lead with water and/or compressing the metallic lead.

17. The method of claim 14, wherein the aqueous lead ion-containing electrolyte is an acidic electrolyte comprising an organic acid or an inorganic salt.

18. The method of claim 14, wherein the ball mill is operated to produce a composition that comprises between 20-40% metallic lead particles and between 60-80% lead oxide particles, and/or wherein the step of ball milling produces a composition with a plurality of lead and lead oxide particles having an average particle size of about 0.1-10 micron.

19. The method of claim 14, wherein the lead feedstock comprises the aqueous solution in an amount of between 0.5 and 5 wt %.

20. The method of claim 14, wherein the liquid lead feedstock has a temperature of at least 650° F.

* * * * *